US005212518A

United States Patent [19]

Numakura et al.

[11] Patent Number: 5,212,518
[45] Date of Patent: May 18, 1993

[54] TONAL CONVERSION METHOD FOR A FADED COLOR PHOTOGRAPHIC ORIGINAL PICTURE

[75] Inventors: Takashi Numakura; Iwao Numakura, both of Tokyo, Japan

[73] Assignee: Yamatoya & Co., Ltd., Tokyo, Japan

[21] Appl. No.: 865,891

[22] Filed: Apr. 8, 1992

[30] Foreign Application Priority Data

Jul. 30, 1991 [JP] Japan .................... 3-211437

[51] Int. Cl.$^5$ .................... G03B 27/32; G03B 27/80
[52] U.S. Cl. .................... 355/77; 355/38
[58] Field of Search .................... 355/32, 35, 38, 68, 355/71, 77, 88; 358/80, 298

[56] References Cited

U.S. PATENT DOCUMENTS

| 4,870,455 | 9/1989 | Morgan, Jr. .................... 355/77 |
| 4,888,611 | 12/1989 | Smallwood, II .................... 355/32 |
| 4,975,737 | 12/1990 | Murooka et al. .................... 355/77 |
| 5,010,398 | 4/1991 | Nys et al. .................... 358/80 |
| 5,072,305 | 12/1991 | Numakura et al. .................... 358/298 |

Primary Examiner—Richard A. Wintercorn
Attorney, Agent, or Firm—Wenderoth, Lind & Ponack

[57] ABSTRACT

Herein disclosed is a tonal conversion method for a faded color original picture useful upon producing a printed picture in a halftone from a faded color photographic original in a continuous tone. As picture information of tonal conversion, unfaded light intensity values ($Xn$) of a pixel in a faded color photographic original, instead of density information values ($D_{Fn}$) of a corresponding pixel of the same, are used. The light intensity values ($Xn$) may be rationally determined, utilizing an assumption of dye loss and density characteristic curves (S-DCC) of a photographic photosensitive material. The light intensity values ($Xn$) are then converted into halftone dot area % values by conduction of a specific tonal conversion formula.

8 Claims, 2 Drawing Sheets

LIGHT INTENSITY VALUE X

LOGARITHMS OF LIGHT EXPOSURE
(LUX·SECOND)

TONAL CONVERSION METHOD FOR A FADED COLOR PHOTOGRAPHIC ORIGINAL PICTURE

DESCRIPTION OF INVENTION

The present invention relates to a tonal conversion method enabling faithful reproduction of picture quality of a color photographic original picture in an unfaded state from its faded original.

More specifically, the present invention relates to a novel tonal conversion method used upon producing a printed picture in a halftone, where a tone (gradational tone and color tone) of a color photographic original picture in an unfaded state is faithfully reproduced from its faded original in a continuous gradation.

There are a number of cases that one wants or has to produce a printed color picture with picture quality (tone) same as its unfaded color original (This includes a significance as a normal and/or standard color original, compared with a faded.) from its faded original which has passed a long reservation period, for example, over 10 to 20 years, since its photographing.

Namely, a problem of fading occurs when a printed picture is desired to be produced, using a color photographic original which has been photographed in the past (for example, several to several tens of years ago), because its photographic object (or its original), which itself was an object for photographing, has deteriorated with the passage of time, damaged, lost, vanished or destructed by fire.

Rephotographing would be possible but troublesome to obtain an original used for producing a printed picture, if its object (original) is stable for a long period of time. In such the case, a problem same as the set forth above will also occurs when a color photographic original photographed in the past (for example, several to several tens of years ago) is desired to be used.

Fading is, as well known, that dye presenting in a color film original, more concretely, in photographic photosensitive layers (emulsion layers) corresponding to respective colors (R, G and B) of a color transparence is gradually vanished so that the picture quality at the time of photographing has been changed.

As there are various considerable causes of fading, precious color photographic originals should be kept to the utmost under such conditions as in a dark place, low temperature, low moisture, etc., their storage and management thus cost immensely Incidentally, a fading degree may be evaluated in such an assumption that dye loss in the respective emulsion layers (R, G and B) is proportional to contents of dye presenting in the respective emulsion layers. This assumption relating to dye loss is adopted in the present invention.

A restoration technique utilizing a faded color original therein is described in an outstanding report entitled "AN EXAMINATION OF THE USE OF COMMERCIAL SCANNERS TO RESTORE FADED COLOR TRANSPARENCIES" (Preliminary Report) by Jim Wallance (Director Office of Printing & Photographic Services Smithonian Institution) appearing in pages from 151 to 172 of "Topics In PHOTOGRAPHIC PRESERVATION" Vol. 3 (Editor: Robin E. Siegel), American Institute for Conservation Photographic Materials Group 1989.

In this connection, data described in that report relating to fading is as follows (using Echtachrome films):

(1) Original photographed in 1964 (Object: an autumnal farm)
  Dye loss at the time of measuring in 1981: C ... 37%, M ... 3% and Y ... 9%;
  dye loss at the time of measuring in 1988: C ... 45%, M ... 6% and Y ... 12%.
(2) Original photographed in 1964 (Object: a park lane in Blue Ridge)
  Dye loss at the time of measuring in 1981: C ... 32%, M ... 0% and Y ... 2%;
  Dye loss at the time of measuring in 1988: C ... 40%, M ... 0% and Y ... 3%.

As described above, it would be understood that M (magenta) is, in general, the most stable, while C (cyan) rapidly occurs the dye loss.

The report by Jim Wallence indicates that a scanner method (a method using a scanner as a color separation system) is superior than a photographic method (a method using masking in a photographic technique) when comparing the both methods in the case of restoration of a faded color transparency.

Although a manner adopted in the foregoing scanner method is unknown, it can be guessed that the method was carried out in a following manner, considering the faded degree.

For example, the method is performed such that, concerning the dye loss of C (cyan), a halftone dot area % value of 95% is set to a pixel of a fading density of about 1.0 when the initial density of about 3.0 in the shadow area becomes the fading density of 1.0, while electronically adjusting a density gradation ranging from the highlight to the shadow area in the faded original (refer to FIGS. 6 and 9 is said report).

In the report by Jim Wallence, there are not shown procedures and ways of thought about how to rationally alter (i) color separation curves set prior to the fading (i.e., color separation curves set to an unfaded photographic original whose density dynamic range is from 0.1 in the highlight area to 3.0 in the shadow area) into (ii) color separation curves set after the fading (i.e., color separation curves set to a faded original whose density dynamic range from 0.1 in the highlight area to 1.0 in the shadow area). As regarding the importance of setting of color separation curves (tonal conversion curves), which curves are for the tonal conversion of density information values of an original into halftone dot area % values in a color separation work, the above method is therefore considered insufficient, in which the color separation curves would have been set still based on experiences and intuition of the scanner operator or the like.

By the way, the industries of this field presently introduce an advanced and expensive scanner, as a color separating system, or a scanner equipped with a prescanning function or a prepressing function for improving the productivity (operating efficiency) thereof, where the biggest problem is that the most appropriate color separation curves (tonal conversion curves) cannot be rationally set to an original having a different picture quality, individually.

Namely, originals to be color-separated by a scanner include not only standard originals (originals admitted to be standard, of which exposure and development conditions are appropriate) but also over/under originals, color fogged originals, faded color originals, which are taken as the objects in the present invention, and the like. The present state of the art is that the technique for setting color separation curves (tonal conversion curves), which enables rational color separation, has not yet been established.

Zealous investigations have been made by the present inventors, in order to make rational the technique for setting color separation curves (tonal conversion curves, tone reproduction curves), which form a core in the color separation work. In the course of this, it has been found that, instead of the conventional technique for setting color separation curves for the respective color plates, for example, a technique for setting a color separation curve for C plate defined a relation between density information values obtained via R filter relative to the C plate as the complementary color and halftone dot area % values, said density information values are converted into exposure quantity values (hereinafter referred to as "light intensity values", since the present inventors includes them in a concept as light intensity values) by making use of photographic density characteristic functions of the photosensitive material of a color film in which an original picture is taken and said light intensity values are tone-converted converted into halftone dot area % values by a specific tonal conversion formula, that is, color separation curves defined by a relation between the light intensity values and the halftone dot area % values are set, whereby a printed picture with excellent tonal characteristics may be given under such the curves, irrespective of the picture quality of its original, for example, under/over exposured, original difficult to be reproduced such as high/low key, various color fogged, etc. (Japanese Patent Applications Nos. 1-135825 and 1-212118).

The present inventors refer the conventional color separation curves for the respective color plates defined by a relation between density information values and halftone dot area % values as "D axis color separation curves", since they put stress on picture information given from a density axis in photographic density characteristic functions of a photographic photosensitive material. On the contrary, said color separation curves for the respective color plates defined by a relation between light intensity values and halftone dot area % values is referred to as "X axis color separation curves", since picture information given from the light intensity values of the abscissa axis (X axis) in said photographic density characteristic functions, distinguished clearly from the former curves.

As it was found that said X axis color separation curve can bring a printed picture with a density gradation from the H to S area looking very natural to human vision (in other words, linear in density) and with an excellent color, a further investigation has been made, as the next step, by the present inventors into a technique for setting color separation curves for a faded color photographic original, considered to be extremely difficult to be processed in the conventional color separation technique.

Taking into account of the results from the X axis color separation curves substituted for said conventional D axis color separation curves, the present inventors assumed that, if light intensity values of the respective unfaded pixels can be obtained from a faded color photographic original, a gradation and color tone faithful to the original picture (the object before fading) would be able to be reproduced by tone-converting said light intensity values by a tonal conversion formula, which has been proposed previously by the present inventors (Incidentally, "the tonal conversion formula" has essentially the same characteristics as "Tonal Conversion Formula (2-1)" and "Tonal Conversion Formula (2—2)" adopted in the present invention, as will be described later, a difference between the former and the latters being only their conducting conditions.).

As a result, it has been found that a printed picture with a gradation and color tone faithful to a color photographic original in the unfaded state, beyond imagination from the picture quality of its faded original, can be obtained (this point is inspected in comparison with an object which remains little changed in color and quality, such as Japanese paintings), in such a manner that the light intensity values which would be possessed by respective pixels (arbitrary n points) of an unfaded color photographic original are determined under conditions and in a procedure that:

(1) a kind of a photographic sensitive material used upon photographing is known (for example, Echta Chrome, Fuji Chrome, AGFA Chrome, etc.), and its (before faded) photographic density characteristic curve (hereinafter, will be used its abbreviation, as DCC, occasionally) is known;

(2) filter densities of the respective colors (R, G and B) of the color photographic original before faded can be rationally estimated by adopting the assumption of dye loss set forth hereinbefore;

(3) accordingly, the light intensity values of the respective pixels (n points) of the color photographic original before faded can be determined by the estimated filter densities of the respective colors (R, G and B) of the color photographic original before faded and DCC (before faded), the resulting intensity values are converted into halftone dot area % values by conducting the tonal conversion formula, previously proposed by the inventors, so as to make the plates.

An object of the present invention is to provide a novel method in which a picture quality of an object itself at the time of photographing may be reproduced in a printed picture in a halftone, by making use of its faded color photographic original in a continuous tone, surpassing the picture quality of a photographic picture represented in its color photographic original before faded.

In accordance with this invention, there is thus provided a tonal conversion method used upon producing a printed picture in a halftone from a faded color photographic original in a continuous tone comprising the steps of:

(i) obtaining a density information value ($D_{Fn}$) of a pixel (n point) of a color (R, G or B) of the original picture from the faded color photographic original;

(ii) determining an unfaded density information value ($D_{Sn}$) of the pixel of the color from the density information value ($D_{Fn}$) by means of Formula (1):

$$D_{Sn} = D_{Fn} \cdot (D_{Su}/D_{Fu}) \tag{1}$$

where $D_{Su}$: a density information value of an unexposed area (the darkest area) of an unfaded photographic photosensitive material, taking a preset value; and $D_{Fu}$: a measured density information value of an unexposed area (the darkest area) of the faded color photographic original;

(iii) determining a light intensity value ($X_n$) for the color from the density information value ($D_{Sn}$) by utilizing photographic density characteristic functions for the color (R, G or B) of the unfaded photographic photosensitive material used upon photographing the color photographic original and determining a basic light intensity value ($x_n$); and (iv) converting the basic light intensity value ($x_n$) for the color into a halftone dot area % value ($ax_n$) for a corresponding color plate (C, M or Y plate) by means of Tonal Conversion Formula (2-1):

$$Ax_n = a_H + a(1-10^{-\kappa \cdot x_n})(a_S - a_H)/(\alpha - \beta) \quad (2\text{-}1)$$

where $x_n$: a basic light intensity value given by $x_n = [X_n - X_{Hn}]$, said $x_n$ being determined from a difference between a light intensity value ($X_n$) determined from an unfaded density information value ($D_{Sn}$) corresponding to a density information value ($D_{Fn}$) of a pixel (n point) on an original picture and a light intensity value ($X_{Hn}$) determined from an unfaded density information value ($D_{SH}$) corresponding to a density information value ($D_{FH}$) of a highlight area (H area) on the original picture, by utilizing photographic density characteristic functions;

$ax_n$: a halftone dot area % value set to a pixel (n point) on a color plate (C, M or Y) corresponding to a given pixel (n point) in an original;

$a_H$: a halftone dot area % value preset to H part of a color plate;

$a_S$: a halftone dot area % value preset to S part of a color plate;

$\alpha$: a surface reflectance of a paper used for forming a printed picture;

$\beta$: a value determined by $\beta = 10^{-\gamma}$;

$\kappa$: a value determined by $\kappa = \gamma/(X_{Sn} - X_{Hn})$, where $X_{Sn}$ is a light intensity value determined from an unfaded density information value ($D_{SS}$) corresponding to a density information value ($D_{FS}$) of a shadow area (S area) on an original picture, by utilizing an unfaded photographic density characteristic functions; and $\gamma$: an arbitrary coefficient.

In accordance wit this invention, there is also provided a tonal conversion method used upon producing a printed picture in a halftone from a faded color photographic original in a continuous tone comprising the steps of:

(i) obtaining a density information value ($D_{Fn}$) of a pixel (n point) for a color (R, G or B) of the original picture from the faded color photographic original;

(ii) determining photographic density characteristic functions of a faded photographic photosensitive material from corresponding photographic density characteristic functions for the color (R, G or B) of an unfaded photographic photosensitive material used upon photographing the color photographic original by means of formula (3):

$$F_F(X_n) = F_S(X_n) \cdot (D_{Fu}/D_{Su}) \quad (3)$$

where $F_F(X_n)$: showing a part of independent variables of a photographic density characteristic function $D_F = F_F(X_n)$ of a faded photographic photosensitive material;

$F_S(X_n)$: showing a part of independent variables of a photographic density characteristic function $D_S = F_S(X_n)$ of a known unfaded photographic photosensitive material;

$D_{Su}$: a density information value of an unexposed area (the darkest area) of an unfaded photographic photosensitive material, taking a preset value;

$D_{Fu}$: a measured density information value of an unexposed area (the darkest area) of the faded color photographic original;

(iii) determining a light intensity value ($X_n$) from the density information value ($D_{Fn}$) of the color by utilizing the photographic density characteristic functions for the color of the faded photographic photosensitive material and further determining a basic light intensity value ($x_n$); and (iv) converting the basic light intensity value ($x_n$) of the color into a halftone dot area % value ($ax_n$) for a corresponding color plate (C, M or Y plate) by means of tonal conversion formula (2—2):

$$ax_n = a_H + a(1-10^{-\kappa \cdot x_n})(a_S - a_H)/(\alpha - \beta) \quad (2\text{—}2)$$

where $x_n$: a basic light intensity value given by $x_n = [X_n - X_{Hn}]$, said $x_n$ being determined from a difference between a light intensity value ($X_n$) determined from a corresponding density information value ($D_{Fn}$) of a pixel (n point) on an original picture and a light intensity value ($X_{Hn}$) determined from a corresponding density information value ($D_{FH}$) in a highlight area (H area) on the original picture, by utilizing faded photographic density characteristic functions;

$ax_n$: a halftone dot area % value set to a pixel (n point) on a color plate (C, M or Y) corresponding to a given pixel (n point) in an original;

$a_H$: a halftone dot area % value preset to H part of a color plate;

$a_S$: a halftone dot area % value preset to S part of a color plate;

$\alpha$: a surface reflectance of a paper used for forming a printed picture;

$\beta$: a value determined by $\beta = 10^{-\gamma}$;

$\gamma$: an arbitrary coefficient; and $\kappa$: a value determined by $\kappa = \gamma/(X_{Sn} - X_{Hn})$ where $X_{Sn}$ shows a light intensity value determined from a density information value ($D_{FS}$) in a shadow area (S area) on an original, by utilizing faded photographic density characteristic functions.

The tonal conversion method for a faded color photographic original of this invention enables production of a printed picture in a halftone, in which a tone (density gradation and color tone) of an original before faded is faithfully reproduced from its faded color photographic original.

Particularly, a feature of the tonal conversion method of this invention used upon producing a printed picture from a faded color photographic original is that light intensity values not having been affected with the characteristic of a photographic photosensitive material used upon photographing an original picture, instead of conventional density information values, are used as picture information to be an object of tonal conversion so that an original, literally, i.e., an object itself which is not affected with the photographic photosensitive material, is reproduced.

Another feature of "Tonal Conversion Formulae (2-1) and (2—2)" applied to the tonal conversion method of this invention is that the both formulae have an extremely higher degree of freedom in reproduction of the tone (density gradation and color tone) of an original so that a printed picture having a desired tone may be rationally obtained, though still based on production of an original (object itself), as before described.

The present invention has an important significance in a point that it developed a way to rationally process a faded color photographic original, which has been regarded as difficult to be handled in the conventional color separation technique, and produce a printed picture with an excellent quality.

The invention will be further described hereinafter, by way of example only, with reference to the accompanying drawings, in which.

Hereinafter, a technical constitution of the present invention will be described in detail.

In a tonal conversion technique of the present invention, being central and important in production of a printed picture in a halftone from a faded color photographic original, there is adopted a manner in which light intensity values of arbitrary pixels (n points) are tone-converted into halftone dot area % values, instead of the conventional manner in which density information values of arbitrary pixels (n points) on an original picture are tone-converted into an halftone dot area % values. Consequently, should be developed a route to rationally determine the light intensity value of the arbitrary pixel (n point).

Now, the significance of adoption of light intensity values will be shortly described, although it has been described in the previous proposal by the present inventors (Japanese Patent Applications Nos. 1-135825, 1-212118).

As well known, most of originals used upon producing printed pictures are color photographic pictures. In the case of adoption of a color photographic picture as an original, an object (the inventors considering that this and color are true objects of reproduction) is photographed depending on characteristics of a kind of a used photographic photosensitive material (for example, Echta Chrome, Fuji Chrome, AGFA Chrome, etc.), that is, depending on inherent characteristics of photographic density characteristic curves (DCCs).

The inherent characteristics of DCCs will be understood as curves having a complicated form, shown in a orthogonal coordinate system, whose ordinate axis is designated as density values (D values) and abscissa axis is designated as light intensity values (Incidentally, although said light intensity values should be referred to as "light exposure values", they are here referred to such the term from a reason, as will be described hereinafter.). A color photographic original is formed depending on these characteristics.

In other words, light entering into a lens system of a camera from an object exposes a photographic photosensitive material, relying upon the characteristics of DCCs and blackens it (i.e., forms density).

The present inventors paid attention to quantity of incident light (light intensity value) into a photographic photosensitive material from an object via the DCCs rather than photographic density, on the basis of a thought that an object of reproduction should be an object itself, not a color photographic picture on a photographic photosensitive material. It has been thus found that a picture faithful to an object may be obtained when light intensity values are determined from photographic density via DCCs and tonal conversion is performed on the basis of the light intensity values. In this meaning, importance is attached to a concept of light intensity values in the present invention.

A description will next be made of how to rationally determine light intensity values before fading from a faded color original in the tonal conversion method summarized as the first and second feature of the present invention mentioned before. If light intensity values can be determined rationally, the remaining procedure is only to performe tonal conversion by the Tonal Conversion Formula (2-1) or the Tonal Conversion Formula (2—2) so as to determine halftone dot area % values of respective pixels (n points).

Figure 1:
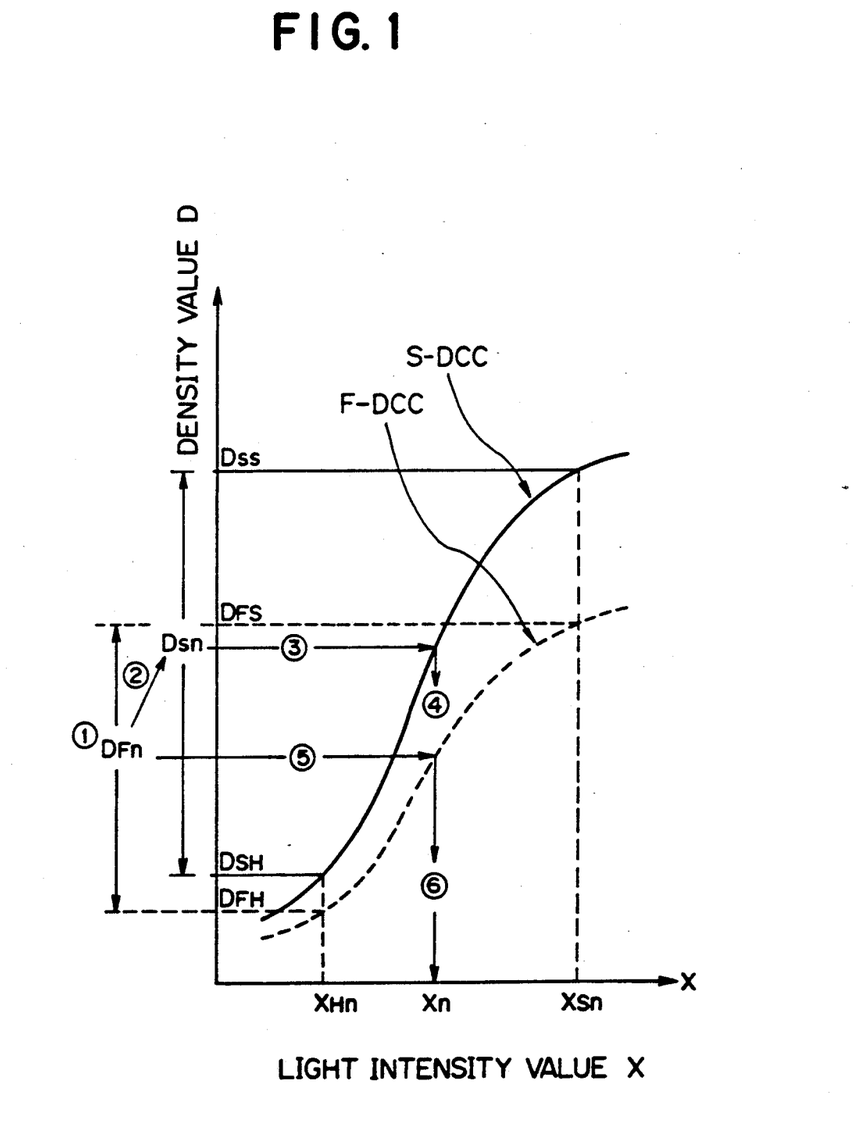
FIG. 1 illustrates a method for determining light intensity values (Xn) not having been affected by characteristics of a photographic photosensitive, from density information values ($D_{Fn}$) of a faded color photographic original.

FIG. 1 shows a manner for determining light intensity values of respective pixels (n point) of an unfaded color photographic original from density information values of its faded color photographic original measured by respective color filters.

In FIG. 1, there are shown two curves of S-DCC and F-DCC in an orthogonal coordinate system, whose ordinate axis shows density values, while whose abscissa axis shows light intensity values.

S-DCC shows a single photographic density characteristic curve (DCC) of a given photographic photosensitive material, while F-DCC shows a change of said S-DCC for reason of fading after a given period of time.

An accompanying letter S means a DCC which becomes a "standard" before fading, while F means "faded".

In the D-X orthogonal coordinate system, S-DCC and F-DCC are curves which are defined by functions $Dsn = Fs(Xn)$ and $D_{Fn} = F_F(Xn)$, respectively. FIG. 1 shows only one DCC among those of the photographic photosensitive materials (emulsion layers) for the respective colors (R, G and B), for the sake of simplification of the drawing. As well known that, in order to make plates for the respective colors (C, M and Y), picture information should be obtained from the corresponding color (R, G or B). However, a description will be now made of a manner how to utilize a characteristic curve (designated as S-DCC) of R photosensitive emulsion layer corresponding to C plate. Manners for the other plates can be performed same as C plate.

FIG. 1 illustrates two routes such as starting from a density information value ($D_{Fn}$) of an arbitrary pixel (n point) in a faded color photographic picture, eliminating an affection from the fading and determining a light intensity value (Xn) of a pixel (n point) corresponding to that in the unfaded color photographic original.

The first route is indicated as (1)→(2)→(3)→(4), while the second route as (1)→(5)→(6) in the drawing. It is a matter of course that these routes correspond to the two foregoing features [(1(i) to (iii) and 2(i) to (iii)] of the present invention, respectively. Next will be described the respective routes, in detail.

First Route 1-(i): (1) indicates a measured density information value in a faded color photographic picture. Namely, a density information value ($D_{Fn}$) of an arbitrary pixel (n point) lies between a density information value ($D_{FH}$) of its highlight area (H part) and a density information value ($D_{FS}$) of its shadow area (S part).

1-(ii): From a route (1)→(2), a density value (Dsn) before fading is estimated. At that time, the assumption of dye loss is employed.

Namely, a rational measure to which extent the fading progresses is determined from density information values in a certain unexposed part of the originals before and after the fading. More specifically, a fading degree is determined from a density information value (Dsu) of an unexposed part (the darkest part) just after photographed in a color photograph and a corresponding density information value ($D_{Fu}$) of the faded color photographic original (Incidentally, accompanying letters S and U represent "before fading" and "unexposed part", respectively.).

Said (Dsu) may be determined in advance such as Dsu=3.20, for the sake of convenience, although there are some cases that the Dsu is diversified depending on a type of the photographic photosensitive material, or there is no unexposed part. Dsn is rationally determined from $D_{Fn}$ on the basis of said fading degree. This is a significance of the foregoing [Formula (1)].

1-(iii): From a route (2)→(3)→(4) in FIG. 1, a light intensity value (Xn) before fading of an arbitrary pixel (n point) of the faded color photographic original is determined from (Dsn) value through S-DCC (This may be readily expressed functionally, as will be described later.).

Second Route 2-(i): The contents of (1) is quite the same as in foregoing 1-(i).

2-(ii): Now will be described the meaning of a route (1)→(5). This route is intended to determine a light intensity value (Xn) on a route (5)→(6), from a correlation between $D_{Fn}$ and F-DCC.

To make the route (1)→(2) established, F-DCC needs to be rationally expressed as functional equations to obtain functions of F-DCC, functions of S-DCC (S-DCC may be readily expressed functionally, as will be described later) is used. At that time, the assumption of dye loss is employed to the functions of S-DCC.

So long as the functions of S-DCC, that is, Dsn=Fs(Xn) is expressed functionally and Dsu and $D_{Fu}$ for determining a fading degree are obtained, function of F-DCC may be readily obtained. This is the significance of foregoing [Formula (3)].

2-(iii): On a route (5)→(6), an unfaded light intensity value (Xn) of an arbitrary pixel (n point) of a faded color photographic original is determined from $D_{Fn}$ value via F-DCC (i.e., functions of F-DCC, more concretely).

Functional expression of S-DCC is extremely important in determining a light intensity value (Xn), as mentioned before. This point will be described hereinafter.

To obtain photographic density characteristic functions, it is sufficient to express functionally S-DCC presented by a manufacturer of the photographic photosensitive materials as technical data and the like.

Figure 2:
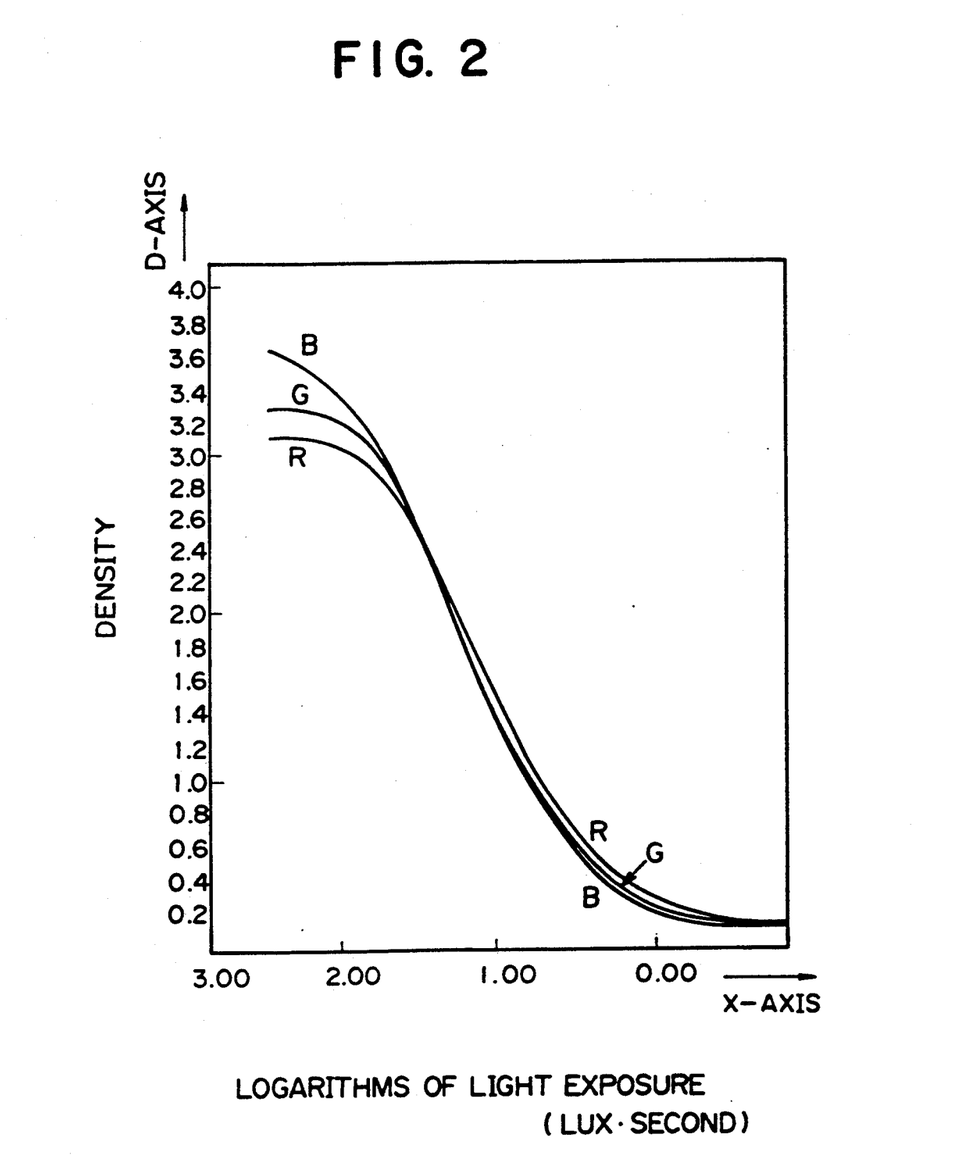
FIG. 2 shows photographic density characteristic curves (S-DCC) of a photographic photosensitive material.

FIG. 2, for instance, shows photographic density characteristic curves of Echta Chrome 64 (trade name) manufactured by Eastman Kodak, professional film (day light).

Expression of the photographic characteristic curves shown in FIG. 2 as equations may be performed in the following manner.

Any suitable manner may be adopted to express the photographic density characteristic curves in equations, without limitation.

Assuming the ordinate axis=D=IO/I, the abscissa axis=X (provided, the graduated scale of the X axis is made to be coincided with the D axis), and a, b, c, d and f being constants, the density characteristic curve may be expressed in equations in such a manner as:

(a) foot of the density characteristic curve (downwards convex shaped part, where D values are small);

$$D = a \cdot b^{c \cdot (Xd) + e} + f$$

(b) a part of an approximately straight line (a substantially straight line part, where D values are intermediate);

$$D = a \cdot X + b, \text{ or}$$

$$D = a \cdot X^2 + bX + c, \text{ and}$$

(c) shoulder (upwards convex shaped part, where the D values are large);

$$D = a \cdot \log\{b + (X + c)\} + d.$$

Or, the density characteristic curve may functionally expressed in such a manner as dividing the foot, substantially straight line part and shoulder into smaller parts and making the divided parts approximate to straight lines, respectively. At this time, it is preferable that, in order to properly reproduce the gradation in the foot and shoulder, these area are divided into parts as small as possible and approximated to respective straight lines.

As shown in FIG. 2, a color photographic film has respective characteristic curves of photosensitive emulsions for R, G and B, they are therefore preferably corresponded to the respective color plates when used. Incidentally, as a convenient manner, it is possible to use a characteristic curve of any one of the emulsion layers.

Results of the above formulation is given in Table 1. In Table 1, there are shown a plurality of formulated sections in order to formularize the photographic density characteristic curves as accurate as possible.

TABLE 1

LIST OF FORMULAE OF PHOTOGRAPHIC DENSITY CHARACTERISTIC CURVES
Formlae converting color original density (D) into X axis values (X)

| Emulsion layer | No. | D | X |
|---|---|---|---|
| R | 1 | 0.1444 — 0.8000 | X = log{(D − 0.0756) + 0.05158} |
|   | 2 | 0.8000 — 1.0000 | X = 1.1475 + 0.7000 (D − 0.8000) |
|   | 3 | 1.0000 — 1.2000 | X = 1.2873 + 0.6000 (D − 1.0000) |
|   | 4 | 1.2000 — 1.4000 | X = 1.4075 + 0.3250 (D − 1.2000) |
|   | 5 | 1.4000 — 2.2000 | X = 1.5125 + 0.3000 (D − 1.4000) |
|   | 6 | 2.2000 — 2.6000 | X = 1.9125 + 0.5215 (D − 2.2000) |
|   | 7 | 2.6000 — 2.8000 | X = 2.1175 + 0.7125 (D − 2.6000) |
|   | 8 | 2.8000 — 3.175 | (D − 2.2638) ÷ 0.4455 (1/100) · 10 X = 1.15 + e |
| G | 1 | 0.1444 — 0.8000 | X = log{(D − 0.0841) + 0.045171 |
|   | 2 | 0.8000 — 1.0000 | X = 1.2000 + 0.7500 |

TABLE 1-continued
LIST OF FORMULAE OF PHOTOGRAPHIC DENSITY CHARACTERISTIC CURVES
Formlae converting color original density (D) into X axis values (X)

| Emulsion layer | No. | D | X |
|---|---|---|---|
| | 3 | 1.0000 − 1.4000 | X = 1.3500 + 0.5825 (D − 0.8000) |
| | 4 | 1.4000 − 1.8000 | X = 1.5760 + 0.50825 (D − 1.0000) |
| | 5 | 1.8000 − 2.6000 | X = 1.7775 + 0.4250 (D − 1.4000) |
| | 6 | 2.6000 − 2.8000 | X = 2.1175 + 0.4125 (D − 1.8000) |
| | 7 | 2.8000 − 3.0000 | X = 2.2000 + 0.8375 (D − 2.6000) |
| | 8 | 3.000 − 3.2178 | (D − 2.7035) + 0.3028 (1/100) · 10 |
| | | | X = 1.2275 + e |
| B | 1 | 0.1333 − 0.8000 | X = log{(D − 0.0758) ÷ 0.43141) |
| | 2 | 0.8000 − 1.0000 | X = 1.2250 + 0.625 (D − 0.8000) |
| | 3 | 1.0000 − 1.4000 | X = 1.3500 + 0.5625 (D − 1.0000) |
| | 4 | 1.4000 − 1.8000 | X = 1.5750 + 0.30825 (D − 1.4000) |
| | 5 | 1.8000 − 2.6000 | X = 1.7775 + 0.4250 (D − 1.8000) |
| | 6 | 2.6000 − 2.8000 | X = 2.1175 + 0.4125 (D − 2.6000) |
| | 7 | 2.8000 − 3.0000 | X = 2.2000 + 0.3250 (D − 2.8000) |
| | 8 | 3.0000 − 3.2000 | X = 2.3050 + 0.5375 (D − 3.0000) |
| | 9 | 3.2000 − 3.4000 | X = 2.4125 + 0.5765 (D − 3.2000) |
| | 10 | 3.4000 − 3.6000 | X = 2.3278 + 1.7380 (D − 3.4000) |

In the present invention, when formularlizing the density characteristic curves as shown in FIG. 2, D and X were expressed in the term of functions, regarding as a scale of D axis representing density values of a color photographic picture and that of X axis representing light intensity values shown by log E of an object (real picture) as the same.

Scaling of D and X axes were performed from a following point of view, the present inventor considering it a quite rational.

That is, in a density characteristic curve, logarithmic values of light exposure E (log E = log I × t) are positioned on the X axis, which are evaluated by logarithmic discrimination characteristics of human vision to brightness. On the other hand, the D axis represents logarithmic physical quantities, literally, which are also logarithmically evaluated by human vision. Accordingly, it is appreciated that no irrationality will occur if correlation of D and X axes is performed on the same scaling.

It is a matter of course that a manner of scaling is not limited to the above example, which is merely for convenience' sake. For instance, it is possible to functionalize them in a relationship of numerical values of the D and X axes shown in FIG. 2. In this relative meaning, there is used a term "light intensity values" conceptually containing light exposure quantity values as physical quantity of X axis, in the present invention.

In the above manner, a picture information value ($X_n$) of an arbitrary pixel (n point) before fading may be rationally determined from a density information value ($D_{fn}$) of a corresponding pixel (n point) in a faded color photographic original. That is, not a density value which has been affected with the characteristics of a photographic photosensitive material as in the conventional manner, but a light intensity value ($X_n$) may be determined as picture information from an original (object) which should be an authentic object, in production of a reproduced picture as a printed picture.

In the foregoing manner according to the present invention for determining a light intensity value ($X_n$) from a faded color photographic original, the following modes may be included.

(a): On the route (1)→(5)→(6), the functions of F-DCC are determined from S-DCC, adopting an assumption of dye loss therein. However, if F-DCC may be defined in experiments or the like, it is possible to determine a light intensity value by functionalizing the F-DCC.

(b): If a faded color photographic original is precious (for example, a sole original), it will occur necessity to duplicate with another photographic photosensitive material. In such a case, it is possible to determine a light intensity value ($X_n$) obtained by functionalizing S-DCC of a photographic photosensitive material used in the duplication. The reason why such the mode becomes feasible is that light intensity values obtained as picture information in this invention has not been affected by the characteristics of the used photographic photosensitive materials.

(c): In the case of (b), it is possible to use functions of S-DCC of the photographic photosensitive materials used upon photographing the faded color photographic original, instead of S-DCC of the photographic photosensitive materials used upon duplication when obtaining the light intensity values ($X_n$).

In the next step in the present invention, a halftone dot area % value is determined by tone-converting the light intensity value ($X_n$) obtained in the above manner under a predetermined "Tonal Conversion Formula".

Hereinafter, description will be made of "Tonal Conversion Formula (2-1)" and "Tonal Conversion Formula (2—2) used in the present invention (hereinafter will be called merely as "Tonal Conversion Formula"). Particularly, the deriving process, conducting manner and the like of said "Tonal Conversion Formula" will be described in detail, for help in understanding the characteristics of said "Tonal Conversion Formula".

"Tonal Conversion Formula" for determining a halftone dot area % value ($a_{Xn}$) which is set to each pixel of an original picture was derived on the basis of a generrally accepted density formula (photographic density, optical density):

$$D = \log IO/I = \log 1/T$$

where
 IO: an incident light quantity;
 I: a reflected light quantity or a transmitted light quantity; and
 T = I/IO: a reflectance or transmittance.

When this general formula relating to density D is applied to plate making and printing:

Density in plate making and printing ($D'$)

-continued $= \log IO/I$ $= \log$ (unit area × reflectance of paper)/{(unit area − halftone dot area) × reflectance of paper + halftone dot area × surface reflectance of ink}

$= \log \alpha A / [\alpha \{A - (d_1 + d_2 + \ldots d_n)\} + \beta(d_1 + d_2 + \ldots d_n)]$ where A: a unit area;
$d_n$: an area of each halftone dot in a unit area;
$\alpha$: a reflectance of a printing paper; and
$\beta$: a surface reflectance of a printing ink.

In the present invention, "Tonal Conversion Formula" was derived on the basis of this density formula (D') relating to plate making and printing, with use of a light intensity value as picture information, instead of a density value, so as to coincide a theoretical value with a measured value in a relation of a basic light intensity value $(x_n)$ of a sampling point (pixel) (n point) in an original picture in a continuous tone with a halftone dot area % value $(a_{xn})$ of a halftone dot of a corresponding sampling point in a printed picture in a halftone.

When conducting said "Tonal Conversion Formula" of this invention, parameters of $a_H$ and $a_S$ are, in general, handled as constants, for example, halftone dot area % are used such as 5% and 95% to $a_{CH}$ and $a_{CS}$ of C plate, respectively, and 3% and 90% to $a_{MH}=a_{YH}$ and $a_{MS}=a_{YS}$ of M and Y plates, respectively. If Xn value which is determined in relation with a Dn value measured by means of a densitometer is used and percentage values are applied to $a_H$ and $a_S$ upon conducting "Tonal Conversion Formula", $a_{xn}$ value will be also calculated in terms of percentage. Upon conduction of "Tonal Conversion Formula", light intensity values (Xn) needs to be converted into basic light intensity values (xn). This is a necessary measure to set predetermined halftone dot area % values ($a_H$, $a_S$) to H and S areas. By the way, basic light intensity values (xn) may be determined in the foregoing manner.

It may be considered, in conduction of "Tonal Conversion Formula" of this invention, that a value of another important parameter $\gamma$ is handled as a constant upon setting a color separation curve for C plate from the following reason. That is, $\gamma$ value may be fixed to 0.40 when setting an X axis color separation curve for C plate. This is led by the present inventors from circumstances of the development of a tonal conversion formula in which a density value is employed as a picture information value, during the development of "Tonal Conversion Formula" of this invention. The tonal conversion formula above mentioned has a framework similar to that of this invention, except for employment of $\gamma$ value=0.9-1.0, as a solid density value for the yellow ink, therein. A reason of employment of the solid density value for the yellow ink was that the yellow ink among the another printing inks has the largest stimulus value to the human vision, compared with the another inks. Whereby, a D axis color separation curve could be set, which is well conformed with the practice of color separation work. In the case of this invention, where a density information value was converted into a light intensity value as a picture information value, it was supported in a number of experiments that $\gamma$ value may take 0.40-0.45, roughly a half of the above value. It can be explained from a shape of a photographic density characteristic curve why the $\gamma$ value should be changed to 0.40-0.45 when a density information value is converted into a light intensity value upon conducting tonal conversion. Recognition that the $\gamma$ value may be rationally altered in such the way is important in this invention. Said $\gamma$ value is a very important parameter, since it can desirably change a shape of a color separation curve according to the purpose, as described later, in other words, a printed picture with desired tonal characteristics may be produced by operating said $\gamma$ value according to a purpose. Consequently, $\gamma$ value needs not to be fixed to the above value.

The parameter value set in this "Tonal Conversion Formula" of this invention becomes diversified depending on a standpoint; faithful reproduction of a tone of a given object (real picture) in a printed picture, or production of a printed picture with a tone intentionally regulated (corrected or altered). In the latter case, a printed picture with a various tone is brought about, because a shape of an X axis color separation curve may be altered into a desired one by intentionally changing the $\gamma$ value. For example, in order to make an X axis color separation curve have an upwards convex shape (in order to emphasize a tone from H part to the middle tone), $\gamma$ takes a value larger than 0, in order to make it have a substantially straight line, $\gamma$ takes a value closer to 0, and in order to make it have a downwards convex shape, the $\gamma$ takes a minus value.

It is free to use "Tonal Conversion Formula" of this invention by voluntarily processing, modifying, derivating it as desired, to say nothing of its modification as follows:

$$a_{Xn} = a_H + E(1 - 10^{-\kappa \cdot xn}) \cdot (a_S - a_H) \quad (2\text{-}3)$$

where $$E = a/(1-\beta) = 1/(1-10^{-\gamma}).$$

In the above modification given by way of example, $\alpha$ takes 1. This means that a surface reflectance of a printing paper (base material) to be used to express a printed picture is set at 100%. It would occur no trouble if $\alpha$ value takes 1.0 in practise for adjustment of the zero position to a brightness of a paper, though possible to take an arbitrary value.

The above modified example ($\alpha=1.0$) has a noticeable characteristics that $a_H$ and $a_S$ may be set to the brightest area H and the darkest area S on a printed paper, as expected. This is obvious from that $_{xn}=0$ in the brightest area H and $_{Xn}=X_{Sn}-X_{Hn}$ in the darkest areas on a printed paper by definition, that is:

$$-k \cdot xn = -\gamma \cdot (X_{Sn} - X_{Hn})/(S_{Xn} - X_{Hn}) = -\gamma.$$

Like this, it is important for a user when forecasting a result of a work that $a_H$ and $a_S$ may be always set on a printed picture as expected upon utilization of "Tonal Conversion Formula" (an modification of $\alpha=1$) of this invention. For example, when desired values are set to $a_H$ and $a_S$ in a printed picture and $\gamma$ value is altered (provided, $\alpha=1.0$), various X axis color separation curves are available. And, a printed picture given under these X axis color separation curves may be readily evaluated in a relation with the $\gamma$ value.

In practise of plate making, an important point is, particularly, that the X axis color separation curves obtained in this invention represent tonal characteristics and tone ranging from H to S part of an printed picture as an end product, unlike the conventional D axis color separation curve. Namely, a plate making operator can accurately predict a finish (tone) of an end printed picture through examination of shapes of X axis color separation curves obtained under predetermined $a_H$, $a_S$ and $\gamma$ value. This resides in an outstanding feature of the tonal conversion method of this invention that X axis color separation curves respectively set to a plurality of original pictures with different qualities (for example, different exposure conditions) all converge into an identical single curve. On the contrary, conventional D axis color separation curves (employed the same $a_H$, $a_S$ and $\gamma$ value therein) brings about curves corresponding to respective original pictures having different qualities, shapes of which are complicated. It is thus impossible to accurately predict a result of an end printed picture from only these curves. The foregoing has an extremely important meaning since accurate prediction about a finish of an end printed picture becomes possible, for example, by representing X axis color separation curves for the respective color plates (C, M and Y) on a monitor, whereby various proofing becomes unnecessary for a plate making operator. Namely, the present invention will enable a direct plate making method).

It is also possible that the k value is normalized to $\gamma$ value, in other words, $(X_{Sn}-X_{Hn})$ value is set at 1.0, upon conducting "Tonal Conversion Formula" of this invention. Such normalization of a dynamic range of $X_{Hm}-X_{Sn}$ to $0-1=1$ brings about a very easy calculation of "Tonal Conversion Formula". Light intensity values of the respective pixels in the dynamic range are, of course, changed according to said normalization, but no problem would occur in setting of color separation curves since their change is relative. Incidentally, hereinafter will be used said normalized values in the following description.

The tonal conversion method for pictures in which said "Tonal Conversion Formula" is used is extremely useful when reproducing a gradation and color tone of an object (real picture), that is, reproducing with work regularity a tone of an object on a printed picture at a rate of 1:1, but usefulness of which is not limited thereto. Also, remarkable usefulness of "Tonal Conversion Formula" of this invention, along with its faithful reproducibility of characteristics of an object, relies upon that picture characteristic of an object may be rationally modified or corrected by appropriately selecting values of $a_H$ and $a_S$ in addition to values of $\alpha$ and $\gamma$.

When conducting said "Tonal Conversion Formula" of this invention in multi-color plate making work (regarded three plates, C, M and Y, or four plates C, M, Y and B as a set), setting of X axis color separation curves may be performed in the following manner. Said "Tonal Conversion Formula" is derived from a standpoint in which C plate, the most important plate, is rationally determined. Consequently, an X axis color separation curve is set by way of conduction of said "Tonal Conversion Formula", to begin with. It is sufficient that another X axis color separation curves for M and Y plates are determined multiplying an appropriate adjusting value well known in the art such as to maintain a gray balance or a color balance. An X axis color separation curve for B plate may be set in accordance with a conventional manner, for example, considering UCR (under color removal), GCR (gray component replacement) and the like. And, the next step for producing C plate is only to operate a dot generator in a color scanner according to said X axis color separation curve for C plate.

Hereinafter will be described the present invention in detail, giving examples.

EXAMPLE 1

(1) Faded color photographic original (A):

Used a photo in which a Japanese painting, "A Japanese woman in bathrobe with a fan (in profile)" by a painter A (Mr. Kuroda) was got on EK-64 (tradename; manufactured by Eastman Kodak, D-day light 64). As understood from Table 2, this is a picture, fairly faded, having a soft gradation and a delicate color-tone, throughout.

(2) Normal color photographic original:

Used a photo in which a Japanese painting was got on EK-64, as well.

(3) Color separation conditions:

(i) Determination of a light intensity value was performed in the steps; measured $D_{Fn}$ value→$D_{Sn}=D_{Fn}$·$(D_{Su}/D_{Fu})$→functions in Table 1→light intensity value $(X_n)$.

Adopted 3.20 to $D_{Su}$ value, and used measured values of the respective color plates (C, M and Y) to $D_{Fu}$ values. Accordingly, $D_{Su}/D_{Fu}$ for C plate becomes 1.2500. About the remaining plates, refer to Table 2.

(ii) Operational conditions of "Tonal Conversion Formula (2-1)" were as follows:

(for C plate): $\gamma$ value=0.4000, $a_H$=5% and $a_S$=95%;
(for M and Y plates): $\gamma$ value=0.1300, $a_H$=3% and $a_S$=90%;

(comment): $\gamma$ values were adjusted in the middle tone (halftone dot 50%) so as to become a difference of 10% between a halftone dot area % value for C plate and that for M and Y plates. Incidentally, the mode for maintaining a gray balance (color balance) of a printed picture as a difference of 10% between the halftone dot area % values in the middle tone is a conventional manner in the art.

(iii) Used MAGNASCAN M-646 (tradename) of Crosfield as a scanner.

(iv) Utilized a Chromalin System (tradename) of DuPont, as a color proofing method.

(4) Color separation data:

Color separation data are given in Table 2. A color printed picture produced on the basis of the data had a quality same as a picture obtained by color-separating a normal color photographic original, which was excellent in reproducibility of gradation and color tone.

TABLE 2

| COLOR SEPARATION TEST DATA OF FADED COLOR PHOTOGRAPHIC ORIGINAL (A) | | | | | |
|---|---|---|---|---|---|
| Color plate | Step | $D_{Fn}$ | $D_{Sn}$ | $X_n$ | Normalized $X_n = x_n$ | $a_{xn}$ |
| C | 1 | 0.4800 | 0.6000 | 0.9750 | 0.0000 | 5.0000 |
|   | 2 | 0.5650 | 0.7063 | 1.0702 | 0.1423 | 23.3675 |
|   | 3 | 0.6500 | 0.8125 | 1.1563 | 0.2711 | 38.0393 |
|   | 4 | 0.8200 | 1.0250 | 1.3025 | 0.4897 | 59.2824 |
|   | 5 | 0.9900 | 1.2375 | 1.4272 | 0.6761 | 74.3073 |
|   | 6 | 1.1600 | 1.4500 | 1.5375 | 0.8411 | 85.6171 |
|   | 7 | 1.3300 | 1.6625 | 1.6438 | 1.0000 | 95.0000 |
|   | Range | 0.8500 | 1.0625 | 0.6688 | 1.0000 | 90.0000 |
| M | 1 | 0.6600 | 0.6600 | 1.8070 | 0.0000 | 3.0000 |
|   | 2 | 0.7750 | 0.7750 | 1.1800 | 0.1339 | 16.2126 |
|   | 3 | 0.8900 | 0.8900 | 1.2675 | 0.2598 | 28.1619 |
|   | 4 | 1.1200 | 1.1200 | 1.4175 | 0.4757 | 47.6335 |
|   | 5 | 1.3500 | 1.3500 | 1.5469 | 0.6619 | 63.4451 |
|   | 6 | 1.5800 | 1.5800 | 1.6661 | 0.8334 | 77.2561 |
|   | 7 | 1.8100 | 1.8100 | 1.7818 | 1.0000 | 90.0000 |

TABLE 2-continued

COLOR SEPARATION TEST DATA OF FADED COLOR PHOTOGRAPHIC ORIGINAL (A)

| Color plate | Step | $D_{Fn}$ | $D_{sn}$ | Xn | Normalized Xn = xn | $a_{xn}$ |
|---|---|---|---|---|---|---|
| | Range | 1.1500 | 1.1500 | 0.6948 | 1.0000 | 87.0000 |
| Y | 1 | 0.6700 | 0.7076 | 1.1649 | 0.0000 | 3.0000 |
| | 2 | 0.7560 | 0.7984 | 1.2240 | 0.1138 | 14.2628 |
| | 3 | 0.8420 | 0.8892 | 1.2808 | 0.2232 | 24.7345 |
| | 4 | 1.014 | 1.0709 | 1.3899 | 0.4332 | 42.9082 |
| | 5 | 1.1860 | 1.2525 | 1.4920 | 0.6299 | 60.7901 |
| | 6 | 1.3580 | 1.4342 | 1.5923 | 0.8230 | 76.8365 |
| | 7 | 1.5300 | 1.6158 | 1.6842 | 1.0000 | 90.0000 |
| | Range | 0.8600 | 0.9082 | 0.5193 | 1.0000 | 87.0000 |
| $D_{SU} \cdot D_{FU}$ | | C | 1.2500 | | | |
| | | M | 1.0000 | | | |
| | | Y | 1.0561 | | | |

EXAMPLE 2

(1) Faded color photographic original (B):

Used a photo in which a Japanese painting, "A dancer in profile (vertical position)" by a painter B, was got on EK-64 (tradename), in a manner similar to Example 1. As shown in Table 3, this is a picture, fairly faded, having a delicate gradation in its highlight area and a lot of neutral tints throughout.

(2) Normal color photographic original:

Used a photo in which a Japanese painting itself was got on EK-64 (tradename), as well.

(3) Color separating conditions:

Adopted conditions completely same to Example 1.

(4) Color analysis data:

Color separation data are given in Table 3. A color printed picture produced on the basis of the data had a quality same as a picture obtained by color-separating a normal color photographic original, which was excellent in reproducibility of gradation and color tone.

TABLE 3

COLOR SEPARATION TEST DATA OF FADED COLOR PHOTOGRAPHIC ORIGINAL (B)

| Color plate | Step | $D_{Fn}$ | $D_{sn}$ | Xn | Normalized Xn = xn | $a_{xn}$ |
|---|---|---|---|---|---|---|
| C | 1 | 0.3800 | 0.5004 | 0.8754 | 0.0000 | 5.0000 |
| | 2 | 0.4810 | 0.6334 | 1.0051 | 0.1521 | 24.5580 |
| | 3 | 0.5820 | 0.7664 | 1.1198 | 0.2867 | 39.7010 |
| | 4 | 0.7840 | 1.0324 | 1.3069 | 0.5062 | 60.6929 |
| | 5 | 0.9860 | 1.2985 | 1.4592 | 0.6849 | 74.9549 |
| | 6 | 1.1880 | 1.5645 | 1.5948 | 0.8439 | 85.8010 |
| | 7 | 1.3900 | 1.8305 | 1.7278 | 1.0000 | 95.0000 |
| | Range | 1.0100 | 1.3301 | 0.8524 | 1.0000 | 90.0000 |
| M | 1 | 0.6300 | 0.6653 | 1.0912 | 0.0000 | 3.0000 |
| | 2 | 0.7580 | 0.8005 | 1.2004 | 0.1400 | 16.8020 |
| | 3 | 0.8860 | 0.9357 | 1.3018 | 0.2703 | 29.1383 |
| | 4 | 1.1420 | 1.2061 | 1.4569 | 0.4695 | 48.1046 |
| | 5 | 1.3980 | 1.4764 | 1.6137 | 0.6710 | 64.1955 |
| | 6 | 1.6540 | 1.7468 | 1.7506 | 0.8469 | 78.3057 |
| | 7 | 1.9100 | 2.0172 | 1.8698 | 1.0000 | 90.0000 |
| | Range | 1.2800 | 1.3519 | 0.7784 | 1.0000 | 87.0000 |
| Y | 1 | 0.7300 | 0.8226 | 1.2391 | 0.0000 | 3.0000 |
| | 2 | 0.8300 | 0.9352 | 1.3095 | 0.1170 | 14.5740 |
| | 3 | 0.9300 | 1.0479 | 1.3769 | 0.2289 | 25.2907 |
| | 4 | 1.1300 | 1.2733 | 1.5037 | 0.4396 | 44.4647 |
| | 5 | 1.3300 | 1.4986 | 1.6249 | 0.6410 | 61.7139 |
| | 6 | 1.5300 | 1.7240 | 1.7390 | 0.8305 | 77.0213 |
| | 7 | 1.7300 | 1.9494 | 1.8410 | 1.0000 | 90.0000 |
| | Range | 1.0000 | 1.1268 | 0.6019 | 1.0000 | 87.0000 |
| $D_{SU} \cdot D_{FU}$ | | C | 1.3169 | | | |
| | | M | 1.0561 | | | |
| | | Y | 1.1268 | | | |

What is claimed is:

1. A tonal conversion method used upon producing a printed picture in a halftone from a faded color photographic original in a continuous tone comprising the steps of:

(i) obtaining a density information value ($D_{Fn}$) of a pixel (n point) of a color (R, G or B) of the original picture from the faded color photographic original;

(ii) determining an unfaded density information value ($D_{Sn}$) of the pixel of the color from the density information value ($D_{Fn}$) by means of Formula (1):

$$D_{Sn} = D_{Fn} \cdot (D_{Su}/D_{Fu}) \tag{1}$$

where $D_{Su}$: a density information value of an unexposed area (the darkest area) of an unfaded photographic photosensitive material, taking a preset value; and $D_{Fu}$: a measured density information value of an unexposed area (the darkest area) of the faded color photographic original;

(iii) determining a light intensity value (Xn) for the color from the density information value ($D_{Sn}$) by utilizing photographic density characteristic functions for the color (R, G or B) of an unfaded photographic photosensitive material used upon photographing the color photographic original and determining a basic light intensity value ($x_n$); and (iv) converting the basic light intensity value ($x_n$) for the color into a halftone dot area % value ($a_{Xn}$) for a corresponding color plate (C, M or Y plate) by means of Tonal Conversion Formula (2-1):

$$A_{Xn} = a_H + \alpha(1 - 10^{-\kappa \cdot Xn})(a_S - a_H)/(\alpha - \beta) \tag{2-1}$$

where $x_n$: a basic light intensity value given by $x_n = [X_n - X_{Hn}]$, said $x_n$ being determined from a difference between a light intensity value (Xn) determined from an unfaded density information value ($D_{Sn}$) corresponding to a density information value ($D_{Fn}$) of a pixel (n point) on an original picture and a light intensity value ($X_{Hn}$) determined from an unfaded density information value ($D_{SH}$) corresponding to a density information value ($D_{FH}$) of a highlight area (H area) on the original picture, by utilizing photographic density characteristic functions;

$a_{Xn}$: a halftone dot area % value set to a pixel (n point) on a color plate (C, M or Y) corresponding to a given pixel (n point) in an original;

$a_H$: a halftone dot area % value preset to H part of a color plate;

$a_S$: a halftone dot area % value preset to S part of a color plate;

$\alpha$: a surface reflectance of a paper used for forming a printed picture;

$\beta$: a value determined by $\beta = 10^{-\gamma}$;

$\kappa$: a value determined by $\kappa = \gamma/(X_{Sn} - X_{Hn})$, where $X_{Sn}$ is a light intensity value determined from an unfaded density information value ($D_{SS}$) corresponding to a density information value ($D_{FS}$) of a shadow area (S area) on an original picture, by utilizing an unfaded photographic density characteristic functions; and $\gamma$: an arbitrary coefficient.

2. A tonal conversion method according to claim 1, wherein the photographic density characteristic functions of the unfaded photographic photosensitive material of the color photographic original are defined by functions of $D_S=F_S(Xn)$ in an orthogonal coordinate system whose ordinate axis represents density values ($D_{Sn}$) and abscissa axis represents light exposure values (Xn).

3. A tonal conversion method according to claim 2, wherein a scale of the abscissa axis is adapted to a scale of the density values of the ordinate axis to determine the light intensity value (Xn) from the density value ($D_{Sn}$).

4. A tonal conversion method according to claim 1, wherein a range ($X_{Hn}-X_{Sn}$) of the light intensity values (Xn) obtained from the density information values ($D_{Sn}$) is normalized to 1.0 (0–1.0).

5. A tonal conversion method used upon producing a printed picture in a halftone from a faded color photographic original in a continuous tone comprising the steps of:

(i) obtaining a density information value ($D_{Fn}$) of a pixel (n point) for a color (R, G or B) of the original picture from the faded color photographic original;

(ii) determining photographic density characteristic functions of a faded photographic photosensitive material from corresponding photographic density characteristic functions for the color (R, G or B) of an unfaded photographic photosensitive material used upon photographing the color photographic original by means of formula (3):

$$F_F(Xn) = F_S(Xn) \cdot (D_{Fu}/D_{Su}) \qquad (3)$$

where $F_F(Xn)$: showing a part of independent variables of a photographic density characteristic function $D_F=F_F(Xn)$ of a faded photographic photosensitive material;

$F_S(Xn)$: showing a part of independent variables of a photographic density characteristic function $D_S=F_S(Xn)$ of a known unfaded photographic photosensitive material;

$D_{Su}$: a density information value of an unexposed area (the darkest area) of an unfaded photographic photosensitive material, taking a preset value;

$D_{Fu}$: a measured density information value of an unexposed area (the darkest area) of the faded color photographic original;

(iii) determining a light intensity value (Xn) from the density information value ($D_{Fn}$) of the color by utilizing the photographic density characteristic functions for the color of the faded photographic photosensitive material and further determining a basic light intensity value ($x_n$); and (iv) converting the basic light intensity value ($x_n$) of the color into a halftone dot area % value ($a_{Xn}$) for a corresponding color plate (C, M or Y plate) by means of tonal conversion formula (2—2):

$$a_{Xn} = a_H + a(1-10^{-\kappa \cdot xn})(a_S-a_H)/(\alpha-\beta) \qquad (2-2)$$

where $x_n$: a basic light intensity value given by $x_n=[Xn-X_{Hn}]$, said $x_n$ being determined from a difference between a light intensity value (Xn) determined from a corresponding density information value ($D_{Fn}$) of a pixel (n point) on an original picture and a light intensity value ($X_{Hn}$) determined from a corresponding density information value ($D_{FH}$) in a highlight area (H area) on the original picture, by utilizing faded photographic density characteristic functions;

$a_{Xn}$: a halftone dot area % value set to a pixel (n point) on a color plate (C, M or Y) corresponding to a given pixel (n point) in an original);

$a_H$: a halftone dot area % value present to H part of a color plate;

$a_S$: a halftone dot area % value preset to S part of a color plate;

$\alpha$: a surface reflectance of a paper used for forming a printed picture;

$\beta$: a value determined by $\beta = 10^{-\gamma}$;

$\gamma$: an arbitrary coefficient; and $\kappa$: a value determined by $\kappa = \gamma/(X_{Sn}-X_{Hn})$, where $X_{Sn}$ shows a light intensity value determined from a density information value ($D_{FS}$) in a shadow area (S area) on an original, by utilizing faded photographic density characteristic functions.

6. A tonal conversion method according to claim 5, wherein the photographic density characteristic functions of the unfaded photographic photosensitive material of the color photographic original are defined by functions of $D_S=F_S(Xn)$ in an orthogonal coordinate system whose ordinate axis represents density values ($D_{Sn}$) and abscissa axis represents light exposure value (Xn).

7. A tonal conversion method according to claim 5, wherein a scale of the abscissa axis is adapted to a density scale of the ordinate axis to determine the light intensity value (xn) from the density value ($D_{Fn}$).

8. A tonal conversion method according to claim 5, wherein a range ($X_{Hn}-X_{Sn}$) of the light intensity values (Xn) obtained from the density information values ($D_{Fn}$) is normalized to 1.0 (0–1.0).

* * * * *